United States Patent
Kojima

(10) Patent No.: US 11,448,284 B2
(45) Date of Patent: Sep. 20, 2022

(54) VIBRATION ISOLATION DEVICE

(71) Applicant: Prospira Corporation, Kawasaki (JP)

(72) Inventor: Hiroshi Kojima, Tokyo (JP)

(73) Assignee: Prospira Corporation, Kawasaki (JP)

( * ) Notice: Subject to any disclaimer, the term of this patent is extended or adjusted under 35 U.S.C. 154(b) by 139 days.

(21) Appl. No.: 16/636,730

(22) PCT Filed: Oct. 11, 2018

(86) PCT No.: PCT/JP2018/037909
§ 371 (c)(1),
(2) Date: Feb. 5, 2020

(87) PCT Pub. No.: WO2019/074049
PCT Pub. Date: Apr. 18, 2019

(65) Prior Publication Data
US 2020/0217392 A1    Jul. 9, 2020

(30) Foreign Application Priority Data

Oct. 11, 2017  (JP) .............................. JP2017-197631
Oct. 11, 2017  (JP) .............................. JP2017-197632

(51) Int. Cl.
*F16F 13/10*  (2006.01)
*B60K 5/12*  (2006.01)

(52) U.S. Cl.
CPC ............ *F16F 13/10* (2013.01); *B60K 5/1208* (2013.01); *F16F 13/105* (2013.01); *F16F 13/107* (2013.01)

(58) Field of Classification Search
CPC ........ F16F 13/10; F16F 13/107; F16F 13/105; B60K 5/1208
See application file for complete search history.

(56) References Cited

U.S. PATENT DOCUMENTS 4,739,978 A     4/1988  Bodin
6,349,927 B1 *  2/2002  Suzuki .................... F16F 13/26
                                                  267/140.13
(Continued)

FOREIGN PATENT DOCUMENTS

CN      102434619 A     5/2012
CN      206297394 U     7/2017
(Continued)

OTHER PUBLICATIONS

Search Report dated Jan. 25, 2021 from the china National Intellectual Property Administration in CN Application No. 201880065164.9.
(Continued)

*Primary Examiner* — Pamela Rodriguez
(74) *Attorney, Agent, or Firm* — Kenja IP Law PC

(57) ABSTRACT

A partition member (217) of the present invention includes a membrane (231) which forms a part of a partition wall of a main liquid chamber (215), and a first orifice passage (221) which communicates with the main liquid chamber (215) and opens toward a sub liquid chamber (216), and a flow resistance of a liquid in a portion positioned on the main liquid chamber (215) side and the flow resistance of a liquid in a portion (221*a*) positioned on the sub liquid chamber (216) side are different from each other in the first orifice passage (221).

20 Claims, 6 Drawing Sheets

(56) References Cited

U.S. PATENT DOCUMENTS

| | | | | |
|---|---|---|---|---|
| 8,308,147 B2 * | 11/2012 | Kojima | ................ | F16F 13/18 267/140.12 |
| 2002/0079631 A1 | 6/2002 | Nemoto | | |
| 2009/0008195 A1 | 1/2009 | Ueki | | |
| 2018/0045266 A1 | 2/2018 | Schemer et al. | | |

FOREIGN PATENT DOCUMENTS

| | | |
|---|---|---|
| CN | 107208730 A | 9/2017 |
| EP | 1923597 A1 | 5/2008 |
| EP | 2221503 A1 | 8/2010 |
| EP | 3139062 A1 | 3/2017 |
| JP | 2007-085523 A | 4/2007 |
| JP | 2007-100954 A | 4/2007 |
| JP | 4579962 B2 | 11/2010 |
| JP | 2015-218843 A | 12/2015 |

OTHER PUBLICATIONS

Communication dated Jun. 21, 2021, from the European Patent Office in application No. 18866803.2.
International Search Report for PCT/JP2018/037909, dated Dec. 4, 2018.
Chinese Search Report dated Jan. 6, 2022 in Chinese Application No. 201880065164.9.

* cited by examiner

VIBRATION ISOLATION DEVICE

CROSS REFERENCE TO RELATED APPLICATIONS

This application is a National Stage of International Application No. PCT/JP2018/037909 filed Oct. 11, 2018, claiming priority based on Japanese Patent Application No. 2017-197631 filed Oct. 11, 2017 and Japanese Patent Application No. 2017-197632 filed Oct. 11, 2017.

TECHNICAL FIELD

The present invention relates to a vibration isolation device which is applied to, for example, an automobile, an industrial machine, or the like, and absorbs and attenuates vibrations of a vibration generating unit such as an engine.

Priority is claimed on Japanese Patent Application No. 2017-197631 and Japanese Patent Application No. 2017-197632, filed in Japan on Oct. 11, 2017, the contents of which are incorporated herein by reference.

BACKGROUND ART

Conventionally, a vibration isolation device described, for example, in Patent Document 1 below is known. The vibration isolation device includes a cylindrical first mounting member connected to one of a vibration generating unit and a vibration receiving unit and a second mounting member connected to the other thereof, an elastic body connecting the first mounting member to the second mounting member, and a partition member which partitions a liquid chamber in the first mounting member into a main liquid chamber having the elastic body as a part of a partition wall thereof and a sub-liquid chamber. The partition member includes a membrane which forms a part of the partition wall of the main liquid chamber, an intermediate chamber positioned on a side opposite to the main liquid chamber with the membrane sandwiched therebetween and having the membrane as a part of a partition wall thereof, a first orifice passage which is configured to allow the main liquid chamber and the sub liquid chamber to communicate with each other, and, a second orifice passage which is configured to allow an intermediate chamber and the sub liquid chamber to communicate with each other.

CITATION LIST

Patent Document

[Patent Document 1]
Japanese Unexamined Patent Application, First Publication No. 2007-85523

SUMMARY OF INVENTION

Technical Problem

However, in the conventional vibration isolation device, a damping force generated when a rebound load causing a liquid to flow from the sub liquid chamber toward the main liquid chamber side is input cannot be made larger than a damping force generated when a bound load causing a liquid to flow from the main liquid chamber toward the sub liquid chamber side is input.

Also, in the conventional vibration isolation device, a damping force generated when a bound load causing a liquid to flow from the main liquid chamber toward the sub liquid chamber side is input cannot be made larger than a damping force generated when a rebound load causing a liquid to flow from the sub liquid chamber toward the main liquid chamber side is input.

The present invention has been made in view of the above-described circumstances, and an objective thereof is to provide a vibration isolation device in which a damping force generated when a rebound load is input can be made larger than a damping force generated when a bound load is input.

Another objective of the present invention is to provide a vibration isolation device in which a damping force generated when a bound load is input can be made larger than a damping force generated when a rebound load is input.

Solution to Problem

A vibration isolation device according to the present invention includes a cylindrical first mounting member connected to one of a vibration generating unit and a vibration receiving unit and a second mounting member connected to the other thereof, an elastic body connecting the first mounting member and the second mounting member, and a partition member which partitions a liquid chamber in the first mounting member into a main liquid chamber including the elastic body as a part of a partition wall thereof and a sub liquid chamber, in which the partition member includes a membrane which forms a part of the partition wall of the main liquid chamber, and a first orifice passage which communicates with the main liquid chamber and opens toward the sub liquid chamber, and a flow resistance of a liquid in a portion positioned on the main liquid chamber side and a flow resistance of a liquid in a portion positioned on the sub liquid chamber side are different from each other in the first orifice passage.

Effects of Invention

According to the present invention, a damping force generated when a rebound load is input can be made larger than a damping force generated when a bound load is input. Also, according to the present invention, a damping force generated when a bound load is input can be made larger than a damping force generated when a rebound load is input.

DESCRIPTION OF EMBODIMENTS

Hereinafter, a vibration isolation device according to a first embodiment of the present invention will be described with reference to FIGS. 1 and 2.

Figure 1:
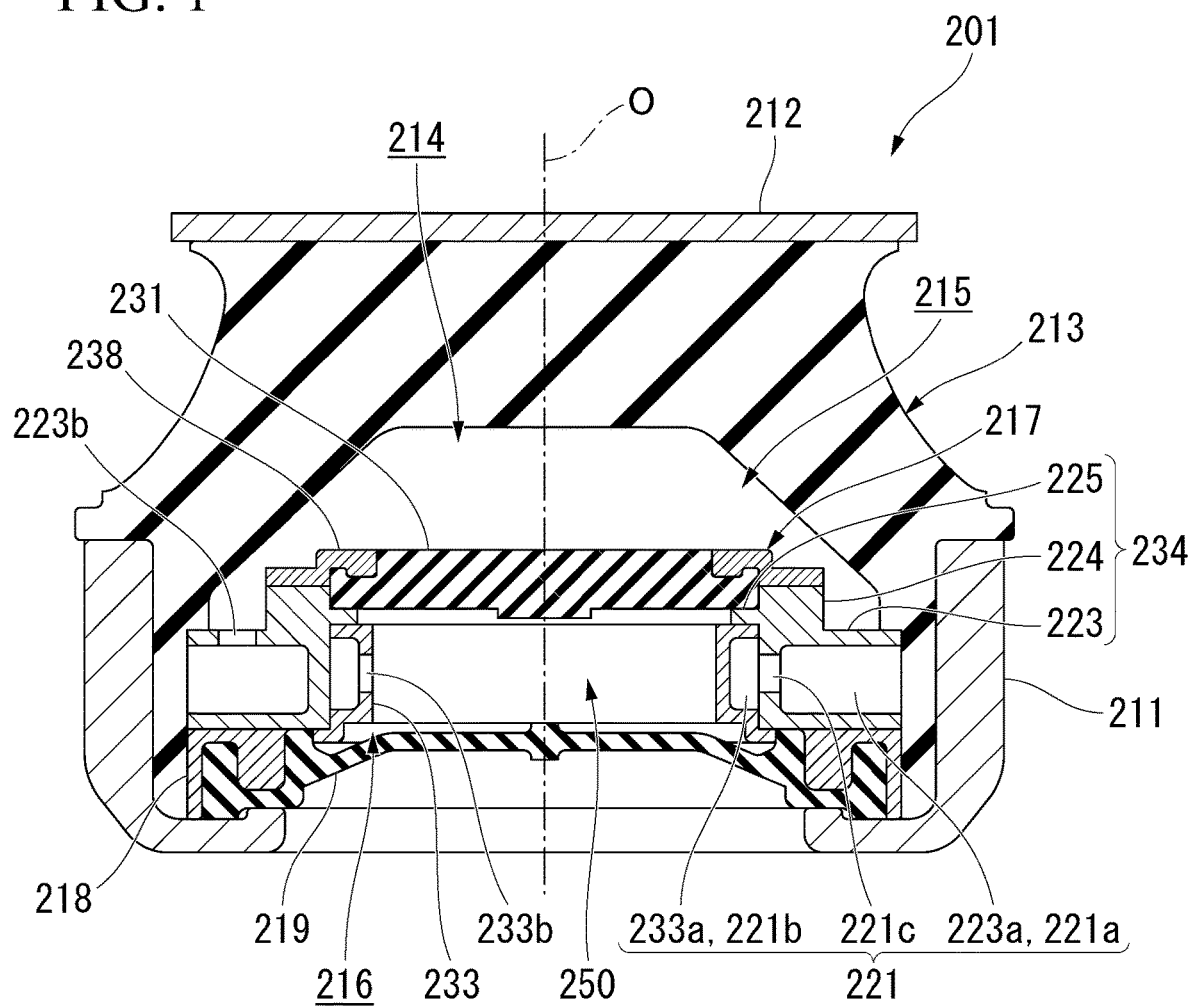
FIG. 1 is a longitudinal sectional view of a vibration isolation device according to one embodiment of the present invention.
Figure 2:
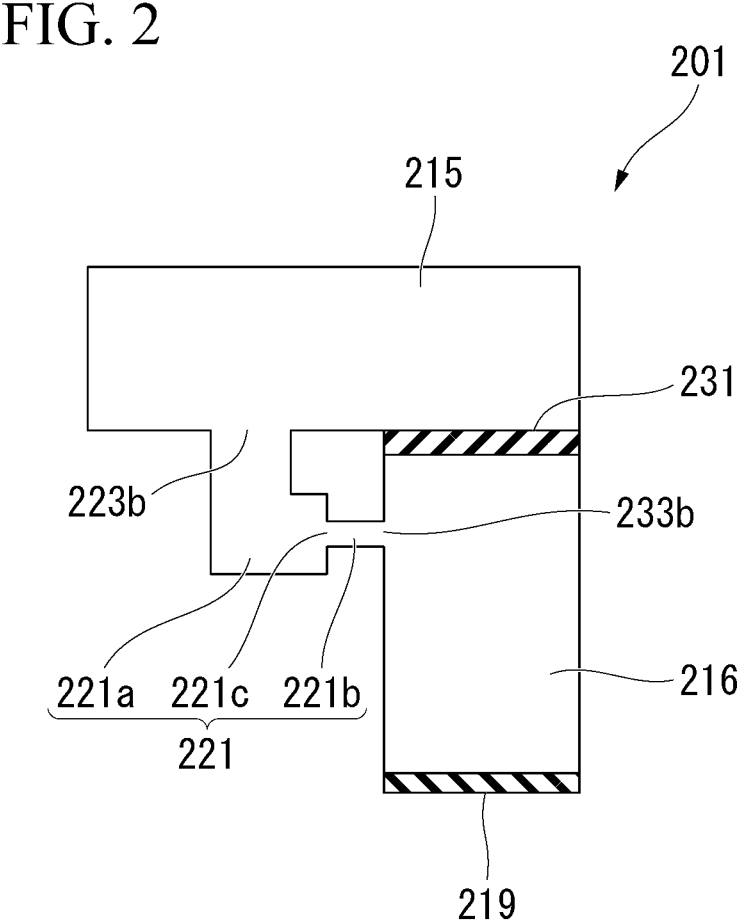
FIG. 2 is a schematic view of the vibration isolation device shown in FIG. 1.

As shown in FIG. 1, a vibration isolation device 201 includes a cylindrical first mounting member 211 connected to one of a vibration generating unit and a vibration receiving unit and a second mounting member 212 connected to the other thereof, an elastic body 213 connecting the first mounting member 211 and the second mounting member 212 to each other, and a partition member 217 which partitions a liquid chamber 214 in the first mounting member 211 into a main liquid chamber 215 having the elastic body 213 as a part of a partition wall thereof and a sub liquid chamber 216. In the shown example, the partition member 217 partitions the liquid chamber 214 in an axial direction along a central axis O of the first mounting member 211.

When the vibration isolation device 201 is used as, for example, an engine mount of an automobile, the first mounting member 211 is connected to a vehicle body serving as a vibration receiving unit, and the second mounting member 212 is connected to an engine serving as a vibration generating unit. Thereby, transmission of vibrations from the engine to the vehicle body can be suppressed.

Hereinafter, the main liquid chamber 215 side in the axial direction with respect to the partition member 217 is referred to as an upper side, and the sub liquid chamber 216 side is referred to as a lower side. Also, in a plan view of the vibration isolation device 201 from the axial direction, a direction perpendicular to the central axis O is referred to as a radial direction, and a direction revolving around the central axis O is referred to as a circumferential direction.

The first mounting member 211 is formed in a bottomed cylindrical shape. A bottom portion of the first mounting member 211 is formed in an annular shape and is disposed coaxially with the central axis O. An inner circumferential surface of a lower portion of the first mounting member 211 is covered with coated rubber formed integrally with the elastic body 213.

The second mounting member 212 has front and rear surfaces formed in a flat plate shape perpendicular to the central axis O. The second mounting member 212 is formed in, for example, a disk shape and is disposed coaxially with the central axis O.

The second mounting member 212 is disposed the above the first mounting member 211. An outer diameter of the second mounting member 212 is equal to an inner diameter of the first mounting member 211.

The elastic body 213 connects an inner circumferential surface of an upper portion of the first mounting member 211 and a lower surface of the second mounting member 212. An upper end opening portion of the first mounting member 211 is sealed by the elastic body 213. The elastic body 213 is vulcanization-bonded to the first mounting member 211 and the second mounting member 212. The elastic body 213 is formed in a topped cylindrical shape and is disposed coaxially with the central axis O. In the elastic body 213, a top wall portion is connected to the second mounting member 212, and a lower end portion of a circumferential wall portion is connected to the first mounting member 211. The circumferential wall portion of the elastic body 213 gradually extends outward in the radial direction downward from an upper side.

A diaphragm ring 218 is fitted into the lower end portion of the first mounting member 211 in a liquid-tight manner with the coated rubber interposed therebetween. The diaphragm ring 218 is formed in a topped cylindrical shape having an annular top wall portion and is disposed coaxially with the central axis O. A cylindrical body that protrudes downward and is disposed coaxially with the central axis O is formed on the top wall portion of the diaphragm ring 218.

An outer circumferential portion of a diaphragm 219 formed of rubber or the like to be elastically deformable is vulcanization-bonded to an inner surface of the diaphragm ring 218. The cylindrical body of the diaphragm ring 218 is embedded in the diaphragm 219. The diaphragm 219 is deformed to expand and contract according to a liquid flowing into and flowing out of the sub liquid chamber 216.

The liquid chamber 214 into which the liquid is sealed is defined by the diaphragm 219 and the elastic body 213 in the first mounting member 211. For example, water, ethylene glycol, or the like can be used as the liquid sealed into the liquid chamber 214.

The partition member 217 has front and rear surfaces formed in a disc shape perpendicular to the central axis O and is fitted into the first mounting member 211 with the coated rubber interposed therebetween. The liquid chamber 214 in the first mounting member 211 is partitioned by the partition member 217 into the main liquid chamber 215 defined by the elastic body 213 and the partition member 217 and the sub liquid chamber 216 defined by the diaphragm 219 and the partition member 217.

The partition member 217 includes a cylindrical main body member 234 fitted into the first mounting member 211 with the coated rubber interposed therebetween, a membrane 231 which closes an upper end opening portion of the main body member 234 and forms a part of a partition wall of the main liquid chamber 215, an inner member 233 disposed radially inward from the main body member 234, an annular fixing member 238 which fixes the membrane 231 to the main body member 234, and a first orifice passage 221 which communicates with the main liquid chamber and opens toward the sub liquid chamber.

The membrane 231 is formed in a disk shape using an elastic material such as rubber. The membrane 231 is disposed coaxially with the central axis O. The volume of the membrane 231 is smaller than the volume of the elastic body 213.

The main body member 234 includes a main body ring 223 fitted into the first mounting member 211, a fixing cylinder part 224 protruding upward from an inner circumferential edge portion on an upper surface of the main body ring 223, and an annular fixing flange part 225 protruding radially inward from an inner circumferential surface of the fixing cylinder part 224. The main body ring 223, the fixing cylinder part 224, and the fixing flange part 225 are disposed coaxially with the central axis O.

An upper surface of the top wall portion of the diaphragm ring 218 is in liquid-tight contact with a lower surface of the main body ring 223.

The membrane 231 is fitted into the fixing cylinder part 224. An outer circumferential edge portion of a lower surface of the membrane 231 is supported by the fixing flange part 225. The membrane 231 protrudes upward from an upper surface of the fixing cylinder part 224. An outer circumferential edge portion on an upper surface of the membrane 231 is supported by the fixing member 238, and an outer circumferential edge portion of the membrane 231 is axially sandwiched and fixed by the fixing member 238 and the fixing flange part 225. Therefore, the membrane 231 is supported to be elastically deformable in the axial direction with the outer circumferential edge portion as a fixed end. The fixing member 238 is disposed coaxially with the central axis O, an outer circumferential portion of the fixing member 238 is disposed on the upper surface of the fixing cylinder part 224, and an inner circumferential portion thereof supports the upper surface of the membrane 231.

A first orifice groove 223a which opens outward in the radial direction and extends in the circumferential direction is formed on an outer circumferential surface of the main body ring 223 of the main body member 234. An opening on a radially outward side of the first orifice groove 223a is closed by the coated rubber. A first communication hole 223b that allows the main liquid chamber 215 and the first orifice groove 223a to communicate with each other is formed on the upper surface of the main body ring 223. The first communication hole 223b allows the main liquid chamber 215 and the first orifice groove 223a to communicate with each other in the axial direction.

The first orifice groove 223a extends in the circumferential direction over an angular range exceeding 180° from the first communication hole 223b toward one side in the circumferential direction with the central axis O as a center.

The inner member 233 is formed in a cylindrical shape and is disposed coaxially with the central axis O. The inner member 233 is fitted into the main body ring 223 of the main body member 234 in a liquid-tight manner. An upper end opening edge of a circumferential wall portion of the inner member 233 is in contact with a lower surface of the fixing flange part 225 of the main body member 234.

A second orifice groove 233a which opens outward in the radial direction and extends in the circumferential direction is formed on an outer circumferential surface of the circumferential wall portion of the inner member 233. An opening on a radially outward side of the second orifice groove 233a is closed by an inner circumferential surface of the main body ring 223. A second communication hole 233b that allows the second orifice groove 233a and the sub liquid chamber 216 to communicate with each other is formed on an inner circumferential surface of the circumferential wall portion of the inner member 233. The second communication hole 233b allows the second orifice groove 233a and the sub liquid chamber 216 to communicate with each other in the radial direction.

The second orifice groove 233a extends in the circumferential direction over an angular range exceeding 180° from the second communication hole 233b toward one side in the circumferential direction with the central axis O as a center. End portions on one side in the circumferential direction of the second orifice groove 233a and the first orifice groove 223a are disposed at equivalent circumferential positions.

The sub liquid chamber 216 of the present embodiment is defined by the membrane 231, the inner member 233 of the partition member 217, and the diaphragm 219. That is, the sub liquid chamber 216 has an inner region 250 positioned on a radially inward from the inner member 233.

Here, a connection hole 221c that allows the first orifice groove 223a and the second orifice groove 233a to communicate with each other is formed in the inner circumferential surface of the main body ring 223. The connection hole 221c allows the first orifice groove 223a and the second orifice groove 233a to communicate with each other in the radial direction. Then, the first orifice passage 221 that allows the main liquid chamber 215 and the sub liquid chamber 216 to communicate with each other is constituted by the first orifice groove 223a in which the opening on a radially outward side is closed by the coated rubber, the second orifice groove 233a in which the opening on a radially outward side is closed by the inner circumferential surface of the main body ring 223, and the connection hole 221c. The first orifice passage 221 communicates with the main liquid chamber 215 and opens toward the sub liquid chamber 216 via the second communication hole 233b.

Hereinafter, in the first orifice passage 221, a portion positioned on the main liquid chamber 215 side and defined by the first orifice groove 223a is referred to as a main liquid chamber side portion 221a, and a portion positioned on the sub liquid chamber 216 side and defined by the second orifice groove 233a is referred to as a sub liquid chamber side portion 221b.

Here, the connection hole 221c connects an end portion on one side in the circumferential direction of the first orifice groove 223a and an end portion on one side in the circumferential direction of the second orifice groove 233a. Thereby, in a process of the liquid flowing from one of the main liquid chamber side portion 221a and the sub liquid chamber side portion 221b, passing through the connection hole 221c, flowing into the other thereof, and flowing through the other, a flow direction of the liquid flowing through the one described above and a flow direction of the liquid flowing through the other described above are opposite to each other in the circumferential direction.

In the present embodiment, a flow resistance of the liquid in the sub liquid chamber side portion 221b is different from a flow resistance of the liquid in the main liquid chamber side portion 221a.

Also, since these operations and effects are achieved by a configuration in which, for example, a member that operates when a hydraulic pressure in the main liquid chamber 215 reaches a predetermined value is not employed, the flow resistance of the liquid in the sub liquid chamber side portion 221b is higher than the flow resistance of the liquid in the main liquid chamber side portion 221a as described above, and the membrane 231 forms a part of the partition walls of both the main liquid chamber 215 and the sub liquid chamber 216, the above-described operation and effects can be stably and accurately achieved even with vibrations having relatively small amplitudes.

In the shown example, a flow path cross-sectional area of the sub liquid chamber side portion 221b is smaller than a flow path cross-sectional area of the main liquid chamber side portion 221a. An opening area of the connection hole 221c is smaller than the flow path cross-sectional area of the sub liquid chamber side portion 221b. A flow path length of the connection hole 221c is smaller than flow path lengths of the main liquid chamber side portion 221a and the sub liquid chamber side portion 221b.

Further, in a longitudinal sectional view of the first orifice passage 221, an axial length of the sub liquid chamber side portion 221b is larger than a radial length of the sub liquid chamber side portion 221b and is equal to an axial length of the main liquid chamber side portion 221a. In the longitudinal sectional view of the first orifice passage 221, a radial length of the main liquid chamber side portion 221a is larger than the axial length of the main liquid chamber side portion 221a.

Here, the flow resistance of the sub liquid chamber side portion 221b and the flow resistance of the second communication hole 233b may be equal to each other or different from each other.

For example, when the flow resistance of the sub liquid chamber side portion 221b is higher than the flow resistance of the second communication hole 233b, the flow resistance of the liquid at the time of entering the sub liquid chamber side portion 221b after passing through the second communication hole 233b increases, and a large damping force is generated when a rebound load for causing the liquid to flow from the sub liquid chamber 216 toward the main liquid chamber 215 side is input.

Also, the flow resistance of the connection hole 221c and the flow resistance of the sub liquid chamber side portion 221b may be equal to each other or different from each other.

For example, when the flow resistance of the connection hole 221c is higher than the flow resistance of the sub liquid chamber side portion 221b, the flow resistance of the liquid at the time of entering the connection hole 221c after passing through the sub liquid chamber side portion 221b increases, and a high damping force is generated when the rebound load is input.

Also, the flow resistance of the main liquid chamber side portion 221a and the flow resistance of the connection hole 221c may be equal to each other or different from each other.

For example, when the flow resistance of the main liquid chamber side portion 221a is higher than the flow resistance of the connection hole 221c, the flow resistance of the liquid at the time of entering the main liquid chamber side portion 221a after passing through the connection hole 221c increases, and a high damping force is generated when the rebound load is input.

Also, the flow resistance of the first communication hole 223b and the flow resistance of the main liquid chamber side portion 221a may be equal to each other or different from each other.

For example, when the flow resistance of the first communication hole 223b is higher than the flow resistance of the main liquid chamber side portion 221a, the flow resistance of the liquid at the time of entering the first communication hole 223b after passing through the main liquid chamber side portion 221a increases, and a high damping force is generated when the rebound load is input.

In the present embodiment, the sub liquid chamber side portion 221b of the first orifice passage 221 is formed as a passage of which a flow path length is larger than a flow path diameter. Here, in the shown example, a flow path cross-sectional shape of the first orifice passage 221 is formed in a rectangular shape, and in this case, a flow path diameter thereof can be expressed by a diameter of a circular shape when the flow path cross-sectional shape is replaced with a circular shape having the same flow path cross-sectional area.

The main liquid chamber side portion 221a of the first orifice passage 221 also is formed as a passage of which a flow path length is larger than a flow path diameter.

As described above, according to the vibration isolation device 201 according to the present embodiment, a high damping force can be generated when the rebound load for causing the liquid to flow from the sub liquid chamber 216 toward the main liquid chamber 215 side is input.

On the other hand, when a liquid of the main liquid chamber 215 flows through the first orifice passage 221 toward the sub liquid chamber 216 side, even when the flow resistance of the main liquid chamber side portion 221a and the flow resistance of the sub liquid chamber side portion 221b differ from each other, since both the portions constitute one continuous orifice passage, a resistance that occurs when the liquid passes through the boundary portion can be suppressed, and a damping force that is generated when a bound load for causing the liquid to flow from the main liquid chamber 215 toward the sub liquid chamber 216 side is input can be suppressed.

Accordingly, the damping force generated when the rebound load is input can be made larger than the damping force generated when the bound load is input, and when a difference between these two damping forces is increased, a ratio of the damping force generated when the rebound load is input to the damping force generated when the bound load is input can be increased.

Further, even when the main liquid chamber 215 suddenly gains a negative pressure according to an input of a large rebound load, since not only the membrane 231 bulges and is deformed toward the main liquid chamber 215 side, such that the negative pressure of the main liquid chamber 215 can be suppressed, but also it is possible to reliably reduce the flow velocity of the liquid flowing from the sub liquid chamber 216 side into the main liquid chamber 215 as described above, occurrence of cavitation can also be suppressed.

Also, since these operations and effects are achieved by the configuration in which, for example, a member that operates when a hydraulic pressure in the main liquid chamber 215 reaches a predetermined value is not employed, the flow resistance of the liquid in the sub liquid chamber side portion 221b is higher than the flow resistance of the liquid in the main liquid chamber side portion 221a as described above, and the membrane 231 forms a part of the partition walls of both the main liquid chamber 215 and the sub liquid chamber 216, the above-described operation and effects can be stably and accurately achieved even with vibrations having relatively small amplitudes.

Accordingly, when the liquid of the main liquid chamber 215 flows into the sub liquid chamber 216 through the first orifice passage 221, a decrease in the flow velocity of the liquid can be suppressed, an increase in the damping force generated when the bound load is input can be suppressed, and thereby the damping force generated when the rebound load is input can be reliably made larger than the damping force generated when the bound load is input.

Also, since the cross-sectional area of the sub liquid chamber 216 is larger than the flow path cross-sectional area of the sub liquid chamber side portion 221b of the first orifice passage 221, resistance generated when the liquid of the sub liquid chamber 216 flows into the sub liquid chamber side portion 221b can be reliably increased, and the damping force generated when the rebound load is input can be reliably increased.

Also, since the sub liquid chamber side portion 221b of the first orifice passage 221 is formed as a passage of which the flow path length is larger than the flow path diameter, resistance applied to the liquid flowing through this portion from the sub liquid chamber 216 side can be more reliably increased.

The technical scope of the present invention is not limited to the above-described embodiment, and various modifications can be made without departing from the gist of the present invention.

Also, in the above-described embodiment, although the vibration isolation device 1 of a compression type in which a positive pressure acts on the main liquid chamber 215 when a support load acts thereon has been described, the present invention is also applicable to a vibration isolation device of a suspension type which is installed such that the main liquid chamber 215 is positioned on a lower side in the vertical direction and the sub liquid chamber 216 is positioned on an upper side in the vertical direction and in which a negative pressure acts on the main liquid chamber 215 when a support load acts thereon.

Also, the vibration isolation device 201 according to the present invention is not limited to the engine mount of vehicles and may also be applied to mounts other than the engine mount. For example, the present invention can also be applied to a generator mount mounted on a construction machine, or to a machine mount installed in a factory or the like.

Also, a configuration in which the flow resistance of the liquid in the main liquid chamber side portion 221a is higher than the flow resistance of the liquid in the sub liquid chamber side portion 221b, and the membrane 231 forms a part of the partition walls of both the main liquid chamber 215 and the sub liquid chamber 216 may be employed.

Hereinafter, a vibration isolation device according to a second embodiment of the present invention will be described with reference to FIGS. 3 and 4.

Figure 3:
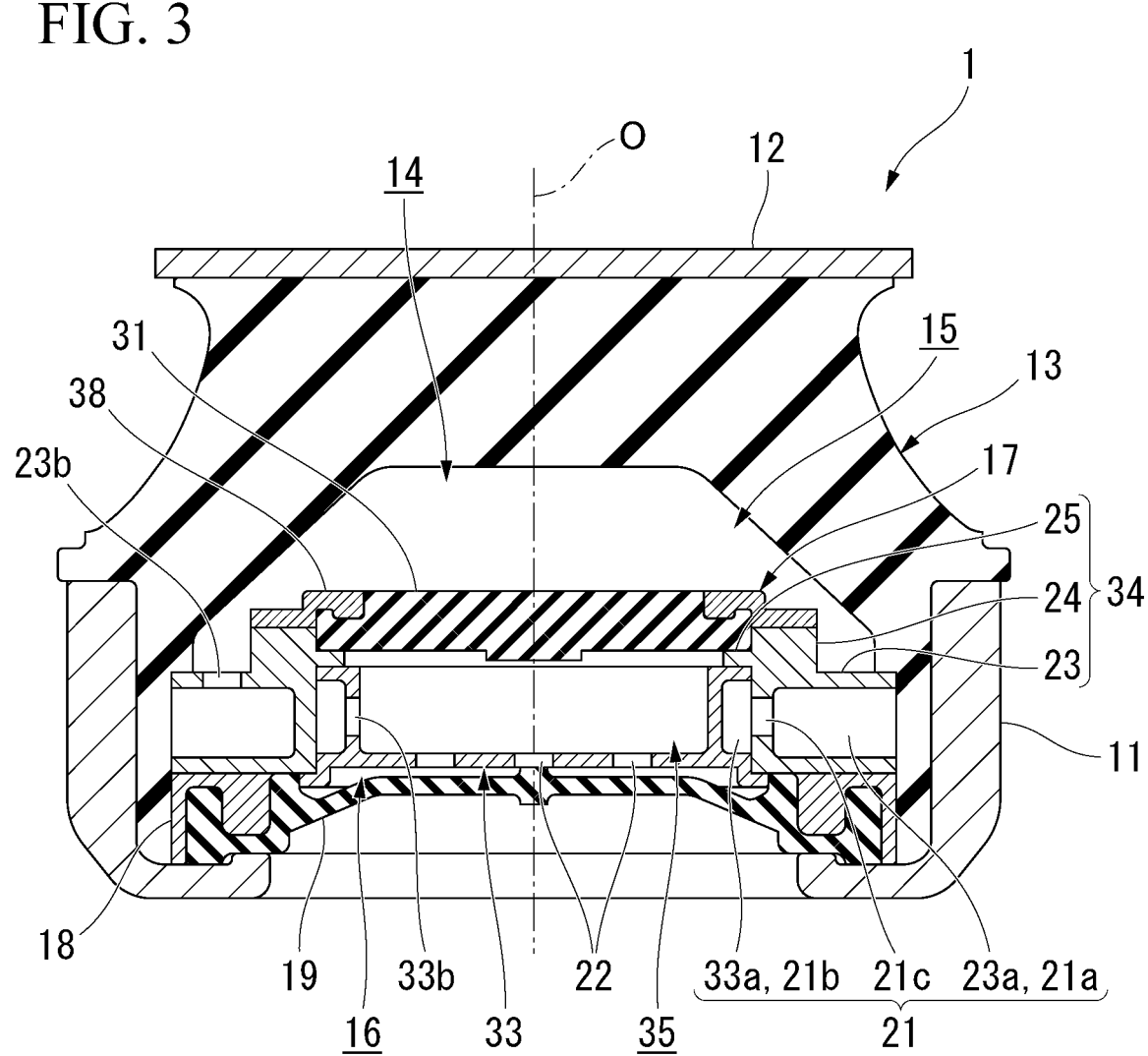
FIG. 3 is a longitudinal sectional view of a vibration isolation device according to one embodiment of the present invention.
Figure 4:
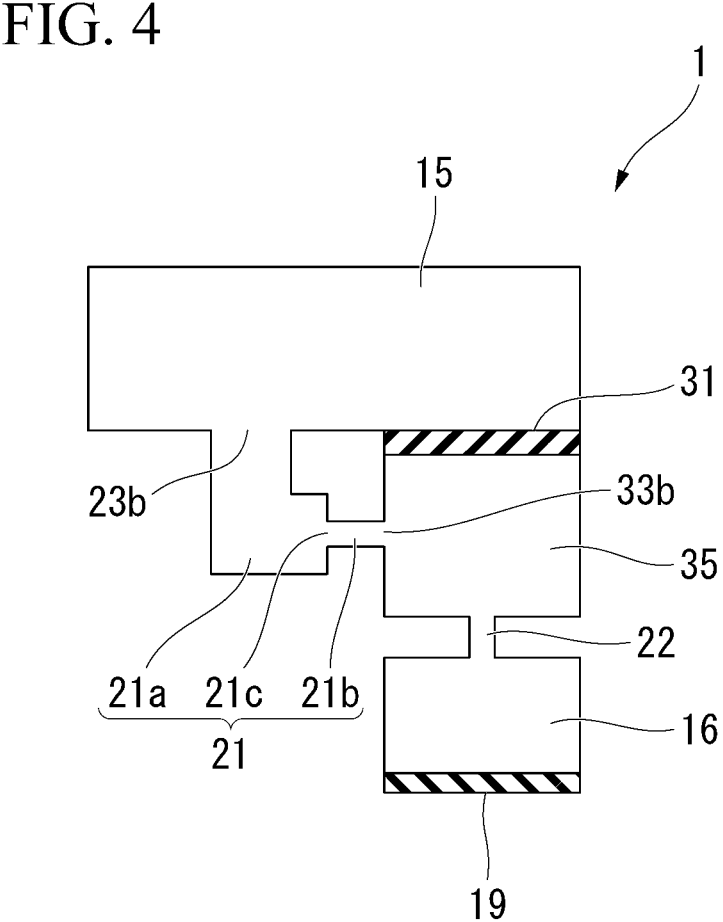
FIG. 4 is a schematic view of the vibration isolation device shown in FIG. 3.

As shown in FIG. 3, a vibration isolation device 1 includes a cylindrical first mounting member 11 connected to one of a vibration generating unit and a vibration receiving unit and a second mounting member 12 connected to the other thereof, an elastic body 13 connecting the first mounting member 11 and the second mounting member 12 to each other, and a partition member 17 which partitions a liquid chamber 14 in the first mounting member 11 into a main liquid chamber 15 having the elastic body 13 as a part of a partition wall thereof and a sub liquid chamber 16. In the shown example, the partition member 17 partitions the liquid chamber 14 in an axial direction along a central axis O of the first mounting member 11.

When the vibration isolation device 1 is used as, for example, an engine mount of an automobile, the first mounting member 11 is connected to a vehicle body serving as a vibration receiving unit, and the second mounting member 12 is connected to an engine serving as a vibration generating unit. Thereby, transmission of vibrations from the engine to the vehicle body can be suppressed.

Hereinafter, the main liquid chamber 15 side in the axial direction with respect to the partition member 17 is referred to as an upper side, and the sub liquid chamber 16 side is referred to as a lower side. Also, in a plan view of the vibration isolation device 1 from the axial direction, a direction perpendicular to the central axis O is referred to as a radial direction, and a direction revolving around the central axis O is referred to as a circumferential direction.

The first mounting member 11 is formed in a bottomed cylindrical shape. A bottom portion of the first mounting member 11 is formed in an annular shape and is disposed coaxially with the central axis O. An inner circumferential surface of a lower portion of the first mounting member 11 is covered with a coated rubber formed integrally with the elastic body 13.

The second mounting member 12 has front and rear surfaces formed in a flat plate shape perpendicular to the central axis O. The second mounting member 12 is formed in, for example, a disk shape and is disposed coaxially with the central axis O.

The second mounting member 12 is disposed above the first mounting member 11. An outer diameter of the second mounting member 12 is equal to an inner diameter of the first mounting member 11.

The elastic body 13 connects an inner circumferential surface of an upper portion of the first mounting member 11 and a lower surface of the second mounting member 12. An upper end opening portion of the first mounting member 11 is sealed by the elastic body 13. The elastic body 13 is vulcanization-bonded to the first mounting member 11 and the second mounting member 12. The elastic body 13 is formed in a topped cylindrical shape and is disposed coaxially with the central axis O. In the elastic body 13, a top wall portion is connected to the second mounting member 12, and a lower end portion of a circumferential wall portion is connected to the first mounting member 11. The circumferential wall portion of the elastic body 13 gradually extends outward in the radial direction downward from an upper side.

A diaphragm ring 18 is fitted into the lower end portion of the first mounting member 11 in a liquid-tight manner with the coated rubber interposed therebetween. The diaphragm ring 18 is formed in a topped cylindrical shape having an annular top wall portion and is disposed coaxially with the central axis O. A cylindrical body that protrudes downward and is disposed coaxially with the central axis O is formed on the top wall portion of the diaphragm ring 18. An outer circumferential portion of a diaphragm 19 formed of rubber or the like to be elastically deformable is vulcanization-bonded to an inner surface of the diaphragm ring 18. The cylindrical body of the diaphragm ring 18 is embedded in the diaphragm 19. The diaphragm 19 is deformed to expand and contract according to a liquid flowing into and flowing out of the sub liquid chamber 16.

The liquid chamber 14 in which the liquid is sealed is defined by the diaphragm 19 and the elastic body 13 in the first mounting member 11. For example, water, ethylene glycol, or the like can be used as the liquid sealed in the liquid chamber 14.

The partition member 17 has front and rear surfaces formed in a disc shape perpendicular to the central axis O and is fitted into the first mounting member 11 with the coated rubber interposed therebetween. The liquid chamber 14 in the first mounting member 11 is partitioned by the partition member 17 into the main liquid chamber 15 defined by the elastic body 13 and the partition member 17, and the sub liquid chamber 16 defined by the diaphragm 19 and the partition member 17.

The partition member 17 includes a cylindrical main body member 34 fitted into the first mounting member 11 with the coated rubber interposed therebetween, a membrane 31 which closes an upper end opening portion of the main body member 34 and forms a part of a partition wall of the main liquid chamber 15, a lower member 33 which closes a lower end opening portion of the main body member 34, an intermediate chamber 35 positioned on a side opposite to the main liquid chamber 15 with the membrane 31 sandwiched therebetween and having the membrane 31 as a part of a partition wall thereof, an annular fixing member 38 which fixes the membrane 31 to the main body member 34, a first orifice passage 21 which allows the main liquid chamber 15 and the intermediate chamber 35 to communicate with each other, and a second orifice passage 22 which allows the intermediate chamber 35 and the sub liquid chamber 16 to communicate with each other.

The membrane 31 is formed in a disk shape using an elastic material such as rubber. The membrane 31 is disposed coaxially with the central axis O. The volume of the membrane 31 is smaller than the volume of the elastic body 13.

The main body member 34 includes a main body ring 23 fitted into the first mounting member 11, a fixing cylinder part 24 protruding upward from an inner circumferential edge portion on an upper surface of the main body ring 23, and an annular fixing flange part 25 protruding radially inward from an inner circumferential surface of the fixing cylinder part 24. The main body ring 23, the fixing cylinder part 24, and the fixing flange part 25 are disposed coaxially with the central axis O.

An upper surface of the top wall portion of the diaphragm ring 18 is in liquid-tight contact with a lower surface of the main body ring 23.

The membrane 31 is fitted into the fixing cylinder part 24. An outer circumferential edge portion of a lower surface of the membrane 31 is supported by the fixing flange part 25. The membrane 31 protrudes upward from an upper surface of the fixing cylinder part 24. An outer circumferential edge portion of an upper surface of the membrane 31 is supported by the fixing member 38, and an outer circumferential edge portion of the membrane 31 is axially sandwiched and fixed by the fixing member 38 and the fixing flange part 25. Therefore, the membrane 31 is supported to be elastically deformable in the axial direction with the outer circumferential edge portion as a fixed end. The fixing member 38 is disposed coaxially with the central axis O, an outer circumferential portion of the fixing member 38 is disposed on the upper surface of the fixing cylinder part 24, and an inner circumferential portion thereof supports the upper surface of the membrane 31.

A first orifice groove 23a which opens outward in the radial direction and extends in the circumferential direction is formed on an outer circumferential surface of the main body ring 23 of the main body member 34. An opening on a radially outward side of the first orifice groove 23a is closed by the coated rubber. A first communication hole 23b that allows the main liquid chamber 15 and the first orifice groove 23a to communicate with each other is formed on the upper surface of the main body ring 23. The first communication hole 23b allows the main liquid chamber 15 and the first orifice groove 23a to communicate with each other in the axial direction.

The first orifice groove 23a extends in the circumferential direction over an angular range exceeding 180° from the first communication hole 23b toward one side in the circumferential direction with the central axis O as a center.

The lower member 33 is formed in a bottomed cylindrical shape and is disposed coaxially with the central axis O. The lower member 33 is fitted into the main body ring 23 of the main body member 34 in a liquid-tight manner. A bottom wall portion of the lower member 33 forms a partition wall that partitions the sub liquid chamber 16 and the intermediate chamber 35 in the axial direction. An upper end opening edge of the circumferential wall portion of the lower member 33 is in contact with a lower surface of the fixing flange part 25 of the main body member 34.

An upper surface of the bottom wall portion of the lower member 33 is spaced downward from a lower surface of the membrane 31. The above-described intermediate chamber 35 is defined by the upper surface of the bottom wall portion and an inner circumferential surface of the circumferential wall portion in the lower member 33, and the lower surface of the membrane 31. The intermediate chamber 35 and the main liquid chamber 15 are partitioned in the axial direction by the membrane 31. The internal volume of the intermediate chamber 35 is smaller than the internal volume of the main liquid chamber 15. Further, the internal volume of the intermediate chamber 35 may be equal to or larger than the internal volume of the main liquid chamber 15.

A second orifice groove 33a which opens outward in the radial direction and extends in the circumferential direction is formed on an outer circumferential surface of the circumferential wall portion of the lower member 33. An opening on a radially outward side of the second orifice groove 33a is closed by an inner circumferential surface of the main body ring 23. A second communication hole 33b that allows the second orifice groove 33a and the intermediate chamber 35 to communicate with each other is formed on the inner circumferential surface of the circumferential wall portion of the lower member 33. The second communication hole 33b allows the second orifice groove 33a and the intermediate chamber 35 to communicate with each other in the radial direction.

The second orifice groove 33a extends in the circumferential direction over an angular range exceeding 180° from the second communication hole 33b toward one side in the circumferential direction with the central axis O as a center. End portions on one side in the circumferential direction of the second orifice groove 33a and the first orifice groove 23a are disposed at equivalent circumferential positions.

The sub liquid chamber 16 is defined by a lower surface of the bottom wall portion of the lower member 33 and the diaphragm 19. The second orifice passage 22 that allows the sub liquid chamber 16 and the intermediate chamber 35 to communicate with each other is formed in the bottom wall portion of the lower member 33. The second orifice passage 22 allows the sub liquid chamber 16 and the intermediate chamber 35 to communicate with each other in the axial direction. An opening portion of the second orifice passage 22 on the intermediate chamber 35 side faces the membrane 31. The second orifice passage 22 is a through hole formed in the bottom wall portion of the lower member 33, and a plurality of second orifice passages 22 are formed in the bottom wall portion of the lower member 33. All the through holes face the membrane 31 in the axial direction.

A flow path cross-sectional area and a flow path length of each of the second orifice passages 22 are smaller than a flow path cross-sectional area and a flow path length of the first orifice passage 21 to be described below. The second orifice passage 22 has the flow path length smaller than an inner diameter thereof. Further, the flow path length of the second orifice passage 22 may be equal to or larger than the inner diameter. A flow resistance of the liquid in each of the second orifice passages 22 is lower than a flow resistance of the liquid in the first orifice passage 21.

Here, a connection hole 21c which allows the first orifice groove 23a and the second orifice groove 33a to communicate with each other is formed on the inner circumferential surface of the main body ring 23. The connection hole 21c allows the first orifice groove 23a and the second orifice groove 33a to communicate with each other in the radial direction. Then, the first orifice passage 21 that allows the main liquid chamber 15 and the intermediate chamber 35 to communicate with each other is constituted by the first orifice groove 23a in which the opening on a radially outward side is closed by the coated rubber, the second orifice groove 33a in which the opening on a radially outward side is closed by the inner circumferential surface of the main body ring 23, and the connection hole 21c.

The first orifice passage 21 opens toward the sub liquid chamber 16 via the second communication hole 33b, the intermediate chamber 35, and the second orifice passage 22.

Hereinafter, in the first orifice passage 21, a portion positioned on the main liquid chamber 15 side and defined by the first orifice groove 23a is referred to as a main liquid chamber side portion 21a, and a portion positioned on the intermediate chamber 35 side and defined by the second orifice groove 33a is referred to as an intermediate chamber side portion 21b.

Here, the connection hole 21c connects an end portion on one side in the circumferential direction of the first orifice groove 23a and an end portion on one side in the circumferential direction of the second orifice groove 33a. Thereby, in a process of the liquid flowing from one of the main liquid chamber side portion 21a and the intermediate chamber side portion 21b, passing through the connection hole 21c, flowing into the other thereof, and then flowing through the other, a flow direction of the liquid flowing through the one described above and a flow direction of the liquid flowing through the other described above are opposite to each other in the circumferential direction.

In the present embodiment, a flow resistance of the liquid in the intermediate chamber side portion 21b is higher than a flow resistance of the liquid in the main liquid chamber side portion 21a.

In the shown example, a flow path cross-sectional area of the intermediate chamber side portion 21b is smaller than a flow path cross-sectional area of the main liquid chamber side portion 21a. An opening area of the connection hole 21c is smaller than the flow path cross-sectional area of the intermediate chamber side portion 21b. A flow path length of the connection hole 21c is smaller than flow path lengths of the main liquid chamber side portion 21a and the intermediate chamber side portion 21b.

Further, in a longitudinal sectional view of the first orifice passage 21, an axial length of the intermediate chamber side portion 21b is larger than a radial length of the intermediate chamber side portion 21b and is equal to an axial length of the main liquid chamber side portion 21a. In the longitudinal sectional view of the first orifice passage 21, a radial length of the main liquid chamber side portion 21a is larger than the axial length of the main liquid chamber side portion 21a.

Here, the flow resistance of the intermediate chamber side portion 21b and the flow resistance of the second communication hole 33b may be equal to each other or different from each other.

For example, when the flow resistance of the intermediate chamber side portion 21b is higher than the flow resistance of the second communication hole 33b, the flow resistance of the liquid at the time of entering the intermediate chamber side portion 21b after passing through the second communication hole 33b increases, and a high damping force is generated when a rebound load for causing the liquid to flow from the sub liquid chamber 16 toward the main liquid chamber 15 side is input.

Also, the flow resistance of the connection hole 21c and the flow resistance of the intermediate chamber side portion 21b may be equal to each other or different from each other.

For example, when the flow resistance of the connection hole 21c is higher than the flow resistance of the intermediate chamber side portion 21b, the flow resistance of the liquid at the time of entering the connection hole 21c after passing through the intermediate chamber side portion 21b increases, and a high damping force is generated when the rebound load is input.

Also, the flow resistance of the main liquid chamber side portion 21a and the flow resistance of the connection hole 21c may be equal to each other or different from each other.

For example, when the flow resistance of the main liquid chamber side portion 21a is higher than the flow resistance of the connection hole 21c, the flow resistance of the liquid at the time of entering the main liquid chamber side portion 21a after passing through the connection hole 21c increases, and a high damping force is generated when the rebound load is input.

Also, the flow resistance of the first communication hole 23b and the flow resistance of the main liquid chamber side portion 21a may be equal to each other or different from each other.

For example, when the flow resistance of the first communication hole 23b is higher than the flow resistance of the main liquid chamber side portion 21a, the flow resistance of the liquid at the time of entering the first communication hole 23b after passing through the main liquid chamber side portion 21a increases, and a high damping force is generated when the rebound load is input.

In the present embodiment, an opening direction in which the first orifice passage 21 opens toward the intermediate chamber 35, that is, an opening direction of the second communication hole 33b toward the intermediate chamber 35 intersects an opening direction in which the second orifice passage 22 opens toward the intermediate chamber 35. In the shown example, the second communication hole 33b opens in the radial direction toward the intermediate chamber 35, and the second orifice passage 22 opens in the axial direction toward the intermediate chamber 35. That is, the opening direction of the second communication hole 33b toward the intermediate chamber 35 is perpendicular to the opening direction of the second orifice passage 22 opening toward the intermediate chamber 35.

In the present embodiment, a cross-sectional area of the intermediate chamber 35 in a direction perpendicular to the opening direction in which the second orifice passage 22 opens toward the intermediate chamber 35 is larger than a flow path cross-sectional area of the intermediate chamber side portion 21b of the first orifice passage 21. In the shown example, the cross-sectional area of the intermediate chamber 35 is larger than the flow path cross-sectional area of the main liquid chamber side portion 21a of the first orifice passage 21 and the flow path cross-sectional area of the second orifice passage 22.

In the present embodiment, the intermediate chamber side portion 21b of the first orifice passage 21 is formed as a passage of which a flow path length is larger than a flow path diameter. Here, in the shown example, a flow path cross-sectional shape of the first orifice passage 21 is formed in a rectangular shape, and in this case, a flow path diameter thereof can be expressed by a diameter of a circular shape when the flow path cross-sectional shape is replaced with a circular shape having the same flow path cross-sectional area.

The main liquid chamber side portion 21a of the first orifice passage 21 also is formed as a passage of which a flow path length is larger than a flow path diameter.

As described above, according to the vibration isolation device 1 according to the present embodiment, since the flow resistance of the liquid in the intermediate chamber side portion 21b is higher than the flow resistance of the liquid in the main liquid chamber side portion 21a in the first orifice passage 21 which allows the main liquid chamber 15 and the intermediate chamber 35 to communicate with each other, high resistance is applied when the liquid of the sub liquid chamber 16 flows into the intermediate chamber side portion 21b of the first orifice passage 21 after passing through the second orifice passage 22 and flowing into the intermediate chamber 35 compared to a case in which the liquid directly flows into the main liquid chamber side portion 21a.

Also, since the partition member 17 includes the intermediate chamber 35, when the liquid of the sub liquid chamber 16 flows into the intermediate chamber 35, the liquid collides with the bottom wall portion of the lower member 33 in which the second orifice passage 22 opens among wall surfaces defining the sub liquid chamber 16, and furthermore, since the intermediate chamber 35 includes the membrane 31 as a part of the partition wall, when the liquid flows from the sub liquid chamber 16 into the intermediate chamber 35 through the second orifice passage 22, the membrane 31 is elastically deformed to bulge toward the main liquid chamber 15 side. Therefore, while the liquid of the sub liquid chamber 16 flows into the first orifice passage 21, the flow velocity thereof is reliably decreased.

As described above, a high damping force can be generated when the rebound load for causing the liquid to flow from the sub liquid chamber 16 toward the main liquid chamber 15 side is input.

On the other hand, when the liquid of the main liquid chamber 15 flows through the first orifice passage 21 toward the sub liquid chamber 16 side, even if the flow resistance is different between the main liquid chamber side portion 21*a* and the intermediate chamber side portion 21*b*, since both the portions constitute one continuous orifice passage, resistance that occurs when the liquid passes through the boundary portion can be suppressed, and a damping force that is generated when a bound load for causing the liquid to flow from the main liquid chamber 15 toward the sub liquid chamber 16 side is input can be suppressed.

Accordingly, the damping force generated when the rebound load is input can be made larger than the damping force generated when the bound load is input, and when a difference between these two damping forces is increased, a ratio of the damping force generated when the rebound load is input to the damping force generated when the bound load is input can be increased.

Further, even when the main liquid chamber 15 suddenly gains a negative pressure according to an input of a large rebound load, since not only the membrane 31 bulges and is deformed toward the main liquid chamber 15 side, such that the negative pressure of the main liquid chamber 15 can be suppressed, but also it is possible to reliably reduce the flow velocity of the liquid flowing from the sub liquid chamber 16 side into the main liquid chamber 15 as described above, occurrence of cavitation can also be suppressed.

Also, since these operations and effects are achieved by the configuration in which, for example, a member that operates when a hydraulic pressure in the main liquid chamber 15 reaches a predetermined value is not employed, the flow resistance of the liquid in the intermediate chamber side portion 21*b* is higher than the flow resistance of the liquid in the main liquid chamber side portion 21*a* as described above, and the membrane 31 forms a part of the partition walls of both the main liquid chamber 15 and the intermediate chamber 35, the above-described operations and effects can be stably and accurately achieved even with vibrations having relatively small amplitudes.

Also, since the opening portion of the second orifice passage 22 on the intermediate chamber 35 side faces the membrane 31, when the liquid of the sub liquid chamber 16 flows into the intermediate chamber 35 through the second orifice passage 22, the membrane 31 can be reliably elastically deformed, and the flow velocity of the liquid flowing into the intermediate chamber 35 from the sub liquid chamber 16 can be reliably decreased.

Also, since the opening direction of the opening portion of the first orifice passage 21 on the intermediate chamber side intersects the opening direction of the opening portion of the second orifice passage 22 on the intermediate chamber 35 side facing the membrane 31, elastic deformation of the membrane 31 when the liquid of the main liquid chamber 15 flows into the intermediate chamber 35 through the first orifice passage 21 can be suppressed compared to elastic deformation of the membrane 31 when the liquid of the sub liquid chamber 16 flows into the intermediate chamber 35 through the second orifice passage 22. Accordingly, when the liquid of the main liquid chamber 15 flows into the intermediate chamber 35 through the first orifice passage 21, a decrease in the flow velocity of the liquid can be suppressed, an increase in the damping force generated when the bound load is input can be suppressed, and thereby the damping force generated when the rebound load is input can be reliably made larger than the damping force generated when the bound load is input.

Also, since the cross-sectional area of the intermediate chamber 35 is larger than the flow path cross-sectional area of the intermediate chamber side portion 21*b* of the first orifice passage 21, resistance generated when the liquid in the intermediate chamber 35 flows into the intermediate chamber side portion 21*b* can be reliably increased, and the damping force generated when the rebound load is input can be reliably increased.

Also, since the intermediate chamber side portion 21*b* of the first orifice passage 21 is formed as a passage of which the flow path length is larger than the flow path diameter, resistance applied to the liquid flowing through this portion from the sub liquid chamber 16 side can be more reliably increased.

The technical scope of the present invention is not limited to the above-described embodiment, and various modifications can be made without departing from the gist of the present invention.

For example, in the above-described embodiment, the first orifice passage 21 extends in the circumferential direction and the second orifice passage 22 extends in the axial direction, but the present invention is not limited thereto.

Also, in the above-described embodiment, although the vibration isolation device 1 of a compression type in which a positive pressure acts on the main liquid chamber 15 when a support load acts thereon has been described, the present invention is also applicable to a vibration isolation device of a suspension type which is installed such that the main liquid chamber 15 is positioned on a lower side in the vertical direction and the sub liquid chamber 16 is positioned on an upper side in the vertical direction and in which a negative pressure acts on the main liquid chamber 15 when a support load acts thereon.

Also, the vibration isolation device 1 according to the present invention is not limited to the engine mount of vehicles and may also be applied to mounts other than the engine mount. For example, the present invention can also be applied to a generator mount mounted on a construction machine, or to a machine mount installed in a factory or the like.

According to the present invention, since a flow resistance of a liquid in a portion positioned on the intermediate chamber side (hereinafter referred to as an intermediate chamber side portion) is higher than a flow resistance of a liquid in a portion positioned on the main liquid chamber side (hereinafter referred to as a main liquid chamber side portion) in the first orifice passage that allows the main liquid chamber and the intermediate chamber to communicate with each other, high resistance is applied when the liquid of the sub liquid chamber flows into the intermediate chamber side portion of the first orifice passage after passing through the second orifice passage and flowing into the intermediate chamber compared to a case in which the liquid directly flows into the main liquid chamber side portion.

Also, since the partition member includes the intermediate chamber, when the liquid of the sub liquid chamber flows into the intermediate chamber, the liquid collides with a surface on which the second orifice passage opens among the wall surfaces defining the sub liquid chamber, and furthermore, since the intermediate chamber includes the membrane as a part of the partition wall, when the liquid flows from the sub liquid chamber into the intermediate chamber through the second orifice passage, the membrane is elastically deformed to bulge toward the main liquid chamber side. Accordingly, while the liquid of the sub liquid chamber flows into the first orifice passage, the flow velocity thereof is reliably decreased.

As described above, a high damping force can be generated when a rebound load for causing the liquid to flow from the sub liquid chamber toward the main liquid chamber side is input.

On the other hand, when the liquid of the main liquid chamber flows through the first orifice passage toward the sub liquid chamber side, even if the flow resistance is different between the main liquid chamber side portion and the intermediate chamber side portion, since both the portions constitute one continuous orifice passage, resistance that occurs when the liquid passes through the boundary portion can be suppressed, and a damping force that is generated when a bound load for causing the liquid to flow from the main liquid chamber toward the sub liquid chamber side is input can be suppressed.

Accordingly, the damping force generated when the rebound load is input can be made larger than the damping force generated when the bound load is input, and when a difference between these two damping forces is increased, a ratio of the damping force generated when the rebound load is input to the damping force generated when the bound load is input can be increased.

Further, even when the main liquid chamber suddenly gains a negative pressure according to an input of a large rebound load, since not only the membrane bulges and is deformed toward the main liquid chamber side, such that the negative pressure of the main liquid chamber can be suppressed, but also it is possible to reliably reduce the flow velocity of the liquid flowing from the sub liquid chamber side into the main liquid chamber as described above, occurrence of cavitation can also be suppressed.

Also, since these operations and effects are achieved by the configuration in which, for example, a member that operates when a hydraulic pressure in the main liquid chamber reaches a predetermined value is not employed, the flow resistance of the liquid in the intermediate chamber side portion is higher than the flow resistance of the liquid in the main liquid chamber side portion as described above, and the membrane forms a part of the partition walls of both the main liquid chamber and the intermediate chamber, the above-described operation and effects can be stably and accurately achieved even with vibrations having relatively small amplitudes.

Here, the opening portion of the second orifice passage on the intermediate chamber side may face the membrane.

In this case, since the opening portion of the second orifice passage on the intermediate chamber side faces the membrane, when the liquid of the sub liquid chamber flows into the intermediate chamber through the second orifice passage, the membrane can be reliably elastically deformed, and a flow velocity of the liquid flowing into the intermediate chamber from the sub liquid chamber can be reliably decreased.

Also, the opening direction in which the first orifice passage opens toward the intermediate chamber may intersect the opening direction in which the second orifice passage opens toward the intermediate chamber.

In this case, since the opening direction of the opening portion of the first orifice passage on the intermediate chamber side intersects the opening direction of the opening portion of the second orifice passage on the intermediate chamber side facing the membrane, elastic deformation of the membrane when the liquid of the main liquid chamber flows into the intermediate chamber through the first orifice passage can be suppressed compared to elastic deformation of the membrane when the liquid in the sub liquid chamber flows into the intermediate chamber through the second orifice passage. Accordingly, when the liquid of the main liquid chamber flows into the intermediate chamber through the first orifice passage, a decrease in the flow velocity of the liquid can be suppressed, an increase in the damping force generated when the bound load is input can be suppressed, and thereby the damping force generated when the rebound load is input can be reliably made larger than the damping force generated when the bound load is input.

Also, a cross-sectional area of the intermediate chamber in a direction perpendicular to the opening direction in which the second orifice passage opens toward the intermediate chamber may be larger than a flow path cross-sectional area of the intermediate chamber side portion of the first orifice passage.

In this case, since the cross-sectional area of the intermediate chamber is larger than the flow path cross-sectional area of the intermediate chamber side portion of the first orifice passage, resistance generated when the liquid of the intermediate chamber flows into the intermediate chamber side portion of the first orifice passage can be reliably increased, and the damping force generated when the rebound load is input can be reliably increased.

Also, the intermediate chamber side portion of the first orifice passage may be formed as a passage of which a flow path length is larger than a flow path diameter.

In this case, since the intermediate chamber side portion of the first orifice passage is formed as a passage of which the flow path length is larger than the flow path diameter, resistance applied to the liquid flowing through this portion from the sub liquid chamber side can be more reliably increased.

Hereinafter, a vibration isolation device according to a third embodiment of the present invention will be described with reference to FIGS. 5 and 6.

Figure 5:
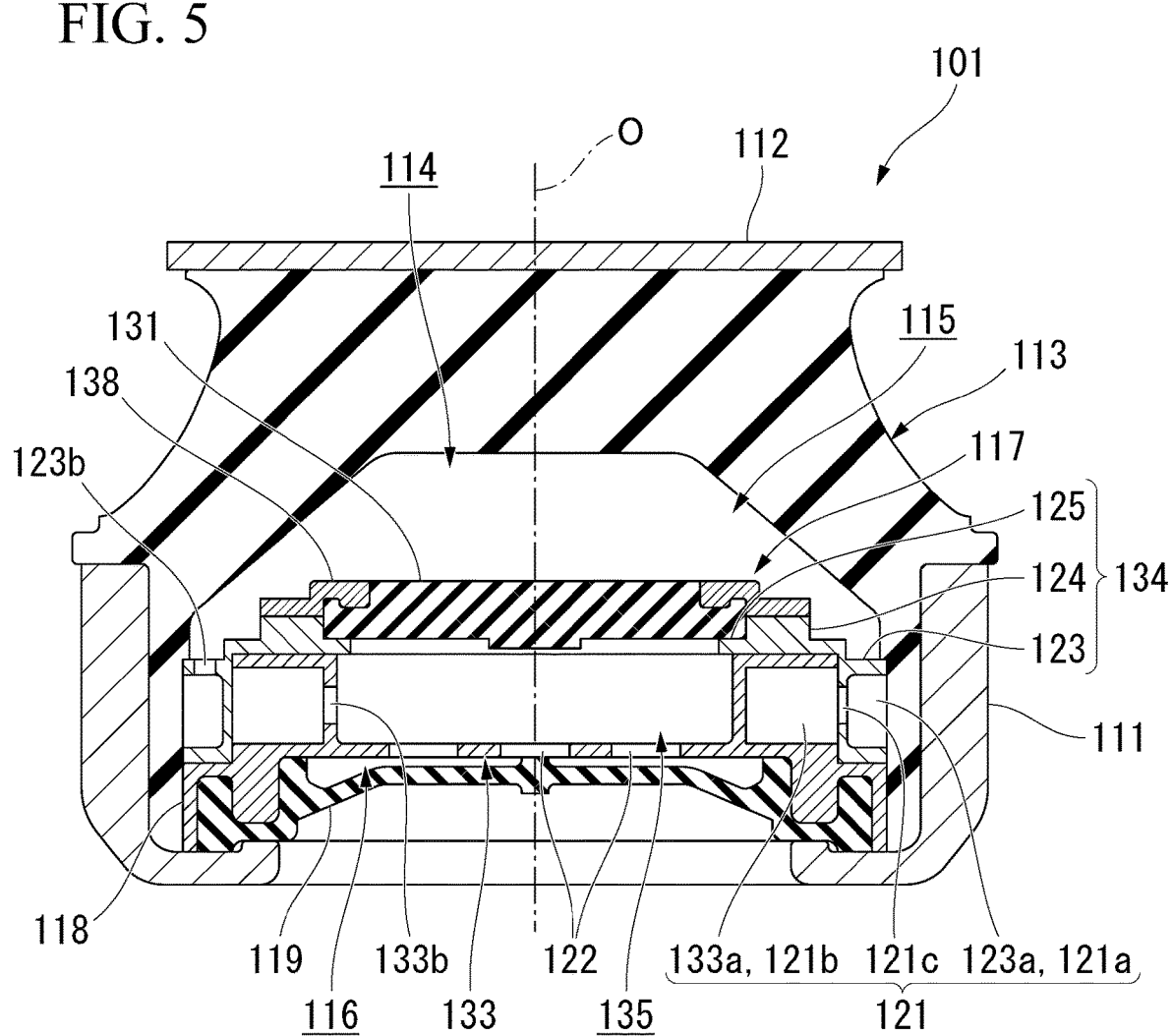
FIG. 5 is a longitudinal sectional view of a vibration isolation device according to one embodiment of the present invention.
Figure 6:
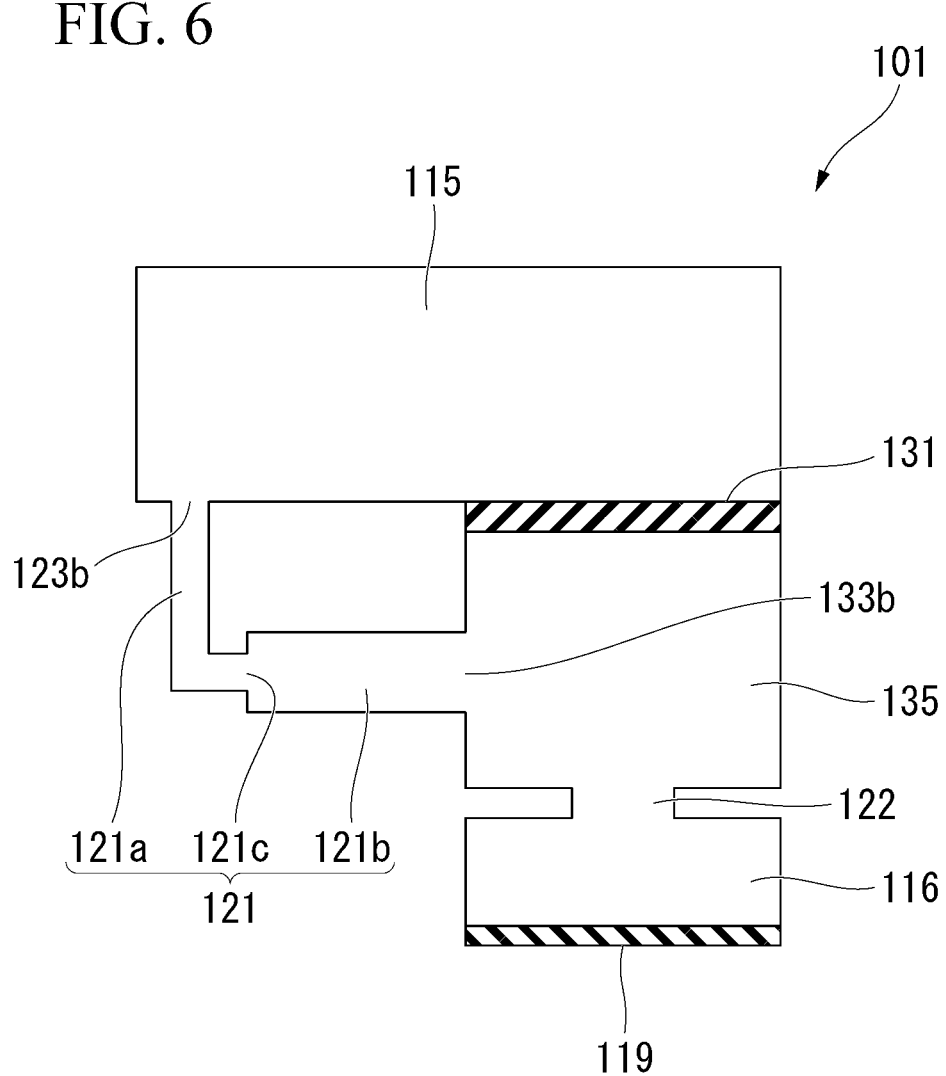
FIG. 6 is a schematic view of the vibration isolation device shown in FIG. 5.

As shown in FIG. 5, a vibration isolation device 101 includes a cylindrical first mounting member 111 connected to one of a vibration generating unit and a vibration receiving unit and a second mounting member 112 connected to the other thereof, an elastic body 113 connecting the first mounting member 111 and the second mounting member 112 to each other, and a partition member 117 which partitions a liquid chamber 114 in the first mounting member 111 into a main liquid chamber 115 having the elastic body 113 as a part of a partition wall thereof and a sub liquid chamber 116. In the shown example, the partition member 117 partitions the liquid chamber 114 in an axial direction along a central axis O of the first mounting member 111.

When the vibration isolation device 101 is used as, for example, an engine mount of an automobile, the first mounting member 111 is connected to a vehicle body serving as a vibration receiving unit, and the second mounting member 112 is connected to an engine serving as a vibration generating unit. Thereby, transmission of vibrations from the engine to the vehicle body can be suppressed.

Hereinafter, the main liquid chamber 115 side in the axial direction with respect to the partition member 117 is referred to as an upper side, and the sub liquid chamber 116 side is referred to as a lower side. Also, in a plan view of the vibration isolation device 101 from the axial direction, a direction perpendicular to the central axis O is referred to as a radial direction, and a direction revolving around the central axis O is referred to as a circumferential direction.

The first mounting member 111 is formed in a bottomed cylindrical shape. A bottom portion of the first mounting member 111 is formed in an annular shape and is disposed coaxially with the central axis O. An inner circumferential surface of a lower portion of the first mounting member 111 is covered with a coated rubber formed integrally with the elastic body 113.

The second mounting member 112 has front and rear surfaces formed in a flat plate shape perpendicular to the central axis O. The second mounting member 112 is formed in, for example, a disk shape and is disposed coaxially with the central axis O.

The second mounting member 112 is disposed above the first mounting member 111. An outer diameter of the second mounting member 112 is equal to an inner diameter of the first mounting member 111.

The elastic body 113 connects an inner circumferential surface of an upper portion of the first mounting member 111 and a lower surface of the second mounting member 112. An upper end opening portion of the first mounting member 111 is sealed by the elastic body 113. The elastic body 113 is vulcanization-bonded to the first mounting member 111 and the second mounting member 112. The elastic body 113 is formed in a topped cylindrical shape and is disposed coaxially with the central axis O. In the elastic body 113, a top wall portion is connected to the second mounting member 112, and a lower end portion of a circumferential wall portion is connected to the first mounting member 111. The circumferential wall portion of the elastic body 113 gradually extends outward in the radial direction downward from an upper side.

A diaphragm ring 118 is fitted into the lower end portion of the first mounting member 111 in a liquid-tight manner with the coated rubber interposed therebetween. The diaphragm ring 118 is formed in a dual cylindrical shape and is disposed coaxially with the central axis O. An outer circumferential portion of a diaphragm 119 formed of rubber or the like to be elastically deformable is vulcanization-bonded to the diaphragm ring 118. In the diaphragm ring 118, the outer cylinder portion is fitted into the first mounting member 111, and the inner cylinder portion is embedded in the diaphragm 119. The diaphragm 119 is vulcanization-bonded to an inner circumferential surface of the outer cylinder portion of the diaphragm ring 118. The diaphragm 119 is deformed to expand and contract according to a liquid flowing into and flowing out of the sub liquid chamber 116.

The liquid chamber 114 in which the liquid is sealed is defined by the diaphragm 119 and the elastic body 113 in the first mounting member 111. For example, water, ethylene glycol, or the like can be used as the liquid sealed in the liquid chamber 114.

The partition member 117 has front and rear surfaces formed in a disc shape perpendicular to the central axis O and is fitted into the first mounting member 111 with the coated rubber interposed therebetween. The liquid chamber 114 in the first mounting member 111 is partitioned by the partition member 117 into the main liquid chamber 115 defined by the elastic body 113 and the partition member 117, and the sub liquid chamber 116 defined by the diaphragm 119 and the partition member 117.

The partition member 117 includes a cylindrical main body member 134 fitted into the first mounting member 111 with the coated rubber interposed therebetween, a membrane 131 which closes an upper end opening portion of the main body member 134 and forms a part of a partition wall of the main liquid chamber 115, a lower member 133 which closes a lower end opening portion of the main body member 134, an intermediate chamber 135 positioned on a side opposite to the main liquid chamber 115 with the membrane 131 sandwiched therebetween and having the membrane 131 as a part of a partition wall thereof, an annular fixing member 138 which fixes the membrane 131 to the main body member 134, a first orifice passage 121 which allows the main liquid chamber 115 and the intermediate chamber 135 to communicate with each other, and a second orifice passage 122 which allows the intermediate chamber 135 and the sub liquid chamber 116 to communicate with each other.

The membrane 131 is formed in a disk shape using an elastic material such as rubber. The membrane 131 is disposed coaxially with the central axis O. The volume of the membrane 131 is smaller than the volume of the elastic body 113.

The main body member 134 includes a main body ring 123 fitted into the first mounting member 111, an outer flange part 124 protruding radially inward from an upper end portion of the main body ring 123, and an inner flange part 125 protruding radially inward from a lower end portion of the outer flange part 124. The main body ring 123, the outer flange part 124, and the inner flange part 125 are disposed coaxially with the central axis O. Lower surfaces of the outer flange part 124 and the inner flange part 125 are coplanar with each other.

The membrane 131 is fitted into the outer flange part 124. An outer circumferential edge portion of a lower surface of the membrane 131 is supported by the inner flange part 125. The membrane 131 protrudes upward with respect to an upper surface of the outer flange part 124. An outer circumferential edge portion of an upper surface of the membrane 131 is supported by the fixing member 138, and an outer circumferential edge portion of the membrane 131 is axially sandwiched and fixed by the fixing member 138 and the inner flange part 125. Therefore, the membrane 131 is supported to be elastically deformable in the axial direction with the outer circumferential edge portion as a fixed end. The fixing member 138 is disposed coaxially with the central axis O, an outer circumferential portion of the fixing member 138 is disposed on the upper surface of the outer flange part 124, and an inner circumferential portion thereof supports the upper surface of the membrane 131.

A first orifice groove 123a which opens outward in the radial direction and extends in the circumferential direction is formed on an outer circumferential surface of the main body ring 123 of the main body member 134. An opening on a radially outward side of the first orifice groove 123a is closed by the coated rubber. A first communication hole 123b that allows the main liquid chamber 115 and the first orifice groove 123a to communicate with each other is formed on an upper surface of the main body ring 123. The first communication hole 123b allows the main liquid chamber 115 and the first orifice groove 123a to communicate with each other in the axial direction.

The first orifice groove 123a extends in the circumferential direction over an angular range exceeding 180° from the first communication hole 123b toward one side in the circumferential direction with the central axis O as a center.

The lower member 133 is formed in a bottomed cylindrical shape and is disposed coaxially with the central axis O. The lower member 133 is fitted into the main body ring 123 of the main body member 134 in a liquid-tight manner. A bottom wall portion of the lower member 133 forms a partition wall that partitions the sub liquid chamber 116 and the intermediate chamber 135 in the axial direction. An upper end opening edge of the circumferential wall portion of the lower member 133 is integrally in contact with lower surfaces of the outer flange part 124 and the inner flange part 125 of the main body member 134. An upper surface of the bottom wall portion of the lower member 133 is spaced downward from a lower surface of the membrane 131. The above-described intermediate chamber 135 is defined by the upper surface of the bottom wall portion and an inner circumferential surface of the circumferential wall portion in the lower member 133, and the lower surface of the membrane 131. The intermediate chamber 135 and the main liquid chamber 115 are partitioned in the axial direction by the membrane 131. The internal volume of the intermediate chamber 135 is smaller than the internal volume of the main liquid chamber 115.

A second orifice groove 133a which opens outward in the radial direction and extends in the circumferential direction is formed on an outer circumferential surface of the circumferential wall portion of the lower member 133. An opening on a radially outward side of the second orifice groove 133a is closed by an inner circumferential surface of the main body ring 123. A second communication hole 133b that allows the second orifice groove 133a and the intermediate chamber 135 to communicate with each other is formed on the inner circumferential surface of the circumferential wall portion of the lower member 133. The second communication hole 133b allows the second orifice groove 133a and the intermediate chamber 135 to communicate with each other in the radial direction.

The second orifice groove 133a extends in the circumferential direction over an angular range exceeding 180° from the second communication hole 133b toward one side in the circumferential direction with the central axis O as a center. End portions on one side in the circumferential direction of the second orifice groove 133a and the first orifice groove 123a are disposed at equivalent circumferential positions.

The sub liquid chamber 116 is defined by a lower surface of the bottom wall portion of the lower member 133 and the diaphragm 119. The second orifice passage 122 that allows the sub liquid chamber 116 and the intermediate chamber 135 to communicate with each other is formed in the bottom wall portion of the lower member 133. The second orifice passage 122 allows the sub liquid chamber 116 and the intermediate chamber 135 to communicate with each other in the axial direction. An opening portion of the second orifice passage 122 on the intermediate chamber 135 side faces the membrane 131. The second orifice passage 122 is a through hole formed in the bottom wall portion of the lower member 133, and a plurality of second orifice passages 122 are formed in the bottom wall portion of the lower member 133. All the second orifice passages 122 face the membrane 131 in the axial direction.

The above-described diaphragm ring 118 is disposed in an outer circumferential edge portion of the lower surface of the bottom wall portion of the lower member 133 positioned radially outward side of the plurality of second orifice passages 122. The diaphragm ring 118 is formed integrally with the lower member 133. In the diaphragm ring 118, a portion positioned on a radially outward side of the inner cylinder portion is positioned on a radially outward side of the lower member 133, and a lower surface of the main body ring 123 is in liquid-tight contact with an upper surface of a connection portion between the outer cylinder portion and the inner cylinder portion.

A flow path cross-sectional area and a flow path length of each of the second orifice passages 122 are smaller than a flow path cross-sectional area and a flow path length of the first orifice passage 121 to be described below. The second orifice passage 122 has the flow path length smaller than an inner diameter thereof. Further, the flow path length of the second orifice passage 122 may be equal to or larger than the inner diameter. A flow resistance of the liquid in each of the second orifice passages 122 is smaller than a flow resistance of the liquid in the first orifice passage 121.

Here, a connection hole 121c which allows the first orifice groove 123a and the second orifice groove 133a to communicate with each other is formed on the inner circumferential surface of the main body ring 123. The connection hole 121c allows the first orifice groove 123a and the second orifice groove 133a to communicate with each other in the radial direction. Then, the first orifice passage 121 that allows the main liquid chamber 115 and the intermediate chamber 135 to communicate with each other is constituted by the first orifice groove 123a in which the opening on a radially outward side is closed by the coated rubber, the second orifice groove 133a in which the opening on a radially outward side is closed by the inner circumferential surface of the main body ring 123, and the connection hole 121c. The first orifice passage 121 opens toward the sub liquid chamber 116 via the second communication hole 133b, the intermediate chamber 135, and the second orifice passage 122.

Hereinafter, in the first orifice passage 121, a portion positioned on the main liquid chamber 115 side and defined by the first orifice groove 123a is referred to as a main liquid chamber side portion 121a, and a portion positioned on the intermediate chamber 135 side and defined by the second orifice groove 133a is referred to as an intermediate chamber side portion 121b.

Here, the connection hole 121c connects an end portion on one side in the circumferential direction of the first orifice groove 123a and an end portion on one side in the circumferential direction of the second orifice groove 133a. Thereby, in a process of the liquid flowing from one of the main liquid chamber side portion 121a and the intermediate chamber side portion 121b, passing through the connection hole 121c, flowing into the other thereof, and then flowing through the other, a flow direction of the liquid flowing through the one described above and a flow direction of the liquid flowing through the other described above are opposite to each other in the circumferential direction.

In the present embodiment, a flow resistance of the liquid in the main liquid chamber side portion 121a is higher than a flow resistance of the liquid in the intermediate chamber side portion 121b.

In the shown example, a flow path cross-sectional area of the main liquid chamber side portion 121a is smaller than a flow path cross-sectional area of the intermediate chamber side portion 121b. An opening area of the connection hole 121c is smaller than the flow path cross-sectional area of the main liquid chamber side portion 121a. A flow path length of the connection hole 121c is smaller than flow path lengths of the main liquid chamber side portion 121a and the intermediate chamber side portion 121b.

Further, in a longitudinal sectional view of the first orifice passage 121, an axial length of the intermediate chamber side portion 121b is equal to a radial length of the intermediate chamber side portion 121b and an axial length of the main liquid chamber side portion 121a. In the longitudinal sectional view of the first orifice passage 121, a radial length of the main liquid chamber side portion 121a is smaller than the axial length of the main liquid chamber side portion 121a.

Here, a flow resistance of the main liquid chamber side portion 121a and a flow resistance of the first communication hole 123b may be equal to each other or different from each other.

For example, when the flow resistance of the main liquid chamber side portion 121a is higher than the flow resistance of the first communication hole 123b, the flow resistance of the liquid at the time of entering the main liquid chamber side portion 121a after passing through the first communication hole 123b increases, and a high damping force is generated when a bound load for causing the liquid to flow from the main liquid chamber 115 toward the sub liquid chamber 116 side is input.

Also, the flow resistance of the connection hole 121c and the flow resistance of the main liquid chamber side portion 121a may be equal to each other or different from each other.

For example, when the flow resistance of the connection hole 121c is higher than the flow resistance of the main liquid chamber side portion 121a, the flow resistance of the liquid at the time of entering the connection hole 121c after passing through the main liquid chamber side portion 121a increases, and a high damping force is generated when the bound load is input.

Further, the flow resistance of the intermediate chamber side portion 121b and the flow resistance of the connection hole 121c may be equal to each other or different from each other.

For example, when the flow resistance of the intermediate chamber side portion 121b is higher than the flow resistance of the connection hole 121c, the flow resistance of the liquid at the time of entering the intermediate chamber side portion 121b after passing through the connection hole 121c increases, and a high damping force is generated when the bound load is input.

Also, the flow resistance of the second communication hole 133b and the flow resistance of the intermediate chamber side portion 121b may be equal to each other or different from each other.

For example, when the flow resistance of the second communication hole 133b is higher than the flow resistance of the intermediate chamber side portion 121b, the flow resistance of the liquid at the time of entering the second communication hole 133b after passing through the intermediate chamber side portion 121b increases, and a high damping force is generated when the bound load is input.

In the present embodiment, an opening direction in which the first orifice passage 121 opens toward the intermediate chamber 135, that is, an opening direction of the second communication hole 133b toward the intermediate chamber 135 intersects an opening direction in which the second orifice passage 22 opens toward the intermediate chamber 135. In the shown example, the second communication hole 133b opens in the radial direction toward the intermediate chamber 135, and the second orifice passage 122 opens in the axial direction toward the intermediate chamber 135. That is, the opening direction of the second communication hole 133b toward the intermediate chamber 135 is perpendicular to the opening direction of the second orifice passage 122 opening toward the intermediate chamber 135.

In the present embodiment, a cross-sectional area of the intermediate chamber 135 in a direction perpendicular to the opening direction in which the second orifice passage 122 opens toward the intermediate chamber 135 is larger than a flow path cross-sectional area of the second orifice passage 122, a flow path cross-sectional area of the intermediate chamber side portion 121b of the first orifice passage 121, and a flow path cross-sectional area of the main liquid chamber side portion 121a of the first orifice passage 121.

In the present embodiment, the main liquid chamber side portion 121a and the intermediate chamber side portion 121b are passages of which flow path lengths are larger than flow path diameters. Here, in the shown example, a flow path cross-sectional shape of the first orifice passage 121 is formed in a rectangular shape, and in this case, a flow path diameter thereof can be expressed by a diameter of a circular shape when the flow path cross-sectional shape is replaced with a circular shape having the same flow path cross-sectional area.

As described above, according to the vibration isolation device 101 according to the present embodiment, since the flow resistance of the liquid in the main liquid chamber side portion 121a is higher than the flow resistance of the liquid in the intermediate chamber side portion 121b in the first orifice passage 121 which allows the main liquid chamber 115 and the intermediate chamber 135 to communicate with each other, high resistance is applied when the liquid of the main liquid chamber 115 flows into the main liquid chamber side portion 121a of the first orifice passage 121 compared to a case in which the liquid directly flows into the intermediate chamber side portion 121b.

Also, since the partition member 117 includes the intermediate chamber 135 having the membrane 131 as a part of the partition wall, when the liquid of the main liquid chamber 115 flows into the intermediate chamber 135 through the first orifice passage 121, the membrane 131 is elastically deformed to bulge toward the main liquid chamber 115 side. Therefore, while the liquid of the main liquid chamber 115 flows into the second orifice passage 122, a flow velocity thereof is reliably decreased.

As described above, a high damping force can be generated when the bound load for causing the liquid to flow from the main liquid chamber 115 toward the sub liquid chamber 116 side is input.

On the other hand, when the liquid on the sub liquid chamber 116 side flows through the first orifice passage 121 toward the main liquid chamber 115, even if the flow resistance is different between the main liquid chamber side portion 121a and the intermediate chamber side portion 121b, since both the portions constitute one continuous orifice passage, resistance that occurs when the liquid passes through the boundary portion can be suppressed, and a damping force that is generated when a rebound load for causing the liquid to flow from the sub liquid chamber 116 side toward the main liquid chamber 115 is input can be suppressed.

Accordingly, the damping force generated when the bound load is input can be made larger than the damping force generated when the rebound load is input, and when a difference between these two damping forces is increased, a ratio of the damping force generated when the bound load is input to the damping force generated when the rebound load is input can be increased.

Further, even when the main liquid chamber 115 suddenly gains a negative pressure according to an input of a large rebound load, since the membrane 131 bulges and is deformed toward the main liquid chamber 115 side such that the negative pressure of the main liquid chamber 115 can be suppressed, occurrence of cavitation can also be suppressed.

Also, since these operations and effects are achieved by the configuration in which, for example, a member that operates when a hydraulic pressure in the main liquid chamber 115 reaches a predetermined value is not employed, the flow resistance of the liquid in the main liquid chamber side portion 121a is higher than the flow resistance of the liquid in the intermediate chamber side portion 121b as described above, and the membrane 131 forms a part of the partition walls of both the main liquid chamber 115 and the intermediate chamber 135, the above-described operations and effects can be stably and accurately achieved even with vibrations having relatively small amplitudes.

Further, since the opening direction in which the first orifice passage 121 opens toward the intermediate chamber 135 intersects the opening direction in which the second orifice passage 122 opens toward the intermediate chamber 135, the liquid that has flowed into the intermediate chamber 135 from the main liquid chamber 115 side can be inhibited from going straight toward the second orifice passage 122, and this liquid can be diffused in the intermediate chamber 135. Thereby, while the liquid of the main liquid chamber 115 flows into the second orifice passage 122, the flow velocity thereof is more reliably decreased.

Also, since the cross-sectional area of the intermediate chamber 135 is larger than the flow path cross-sectional area of the second orifice passage 122, resistance generated when the liquid of the intermediate chamber 135 flows into the second orifice passage 122 can be increased, and a damping force generated when the bound load is input can be reliably increased.

Also, since the main liquid chamber side portion 121a of the first orifice passage 121 is formed as a passage of which the flow path length is larger than the flow path diameter, resistance applied to the liquid flowing through this portion from the main liquid chamber 115 side can be more reliably increased.

The technical scope of the present invention is not limited to the above-described embodiment, and various modifications can be made without departing from the gist of the present invention.

For example, in the above-described embodiment, the first orifice passage 121 extends in the circumferential direction and the second orifice passage 122 extends in the axial direction, but the present invention is not limited thereto.

Also, in the above-described embodiment, although the vibration isolation device 1 of a compression type in which a positive pressure acts on the main liquid chamber 115 when a support load acts thereon has been described, the present invention is also applicable to a vibration isolation device of a suspension type which is installed such that the main liquid chamber 115 is positioned on a lower side in the vertical direction and the sub liquid chamber 116 is positioned on an upper side in the vertical direction and in which a negative pressure acts on the main liquid chamber 115 when a support load acts thereon.

Also, the vibration isolation device 101 according to the present invention is not limited to the engine mount of vehicles and may also be applied to mounts other than the engine mount. For example, the present invention can also be applied to a generator mount mounted on a construction machine, or to a machine mount installed in a factory or the like.

According to the present invention, since the flow resistance of the liquid in a portion positioned on the main liquid chamber side (hereinafter referred to as a main liquid chamber side portion) is higher than the flow resistance of the liquid in a portion positioned on the intermediate chamber side (hereinafter referred to as an intermediate chamber side portion) in the first orifice passage that allows the main liquid chamber and the intermediate chamber to communicate with each other, high resistance is applied when the liquid of the main liquid chamber flows into the main liquid chamber side portion of the first orifice passage compared to a case in which the liquid directly flows into the intermediate chamber side portion.

Also, since the partition member includes the intermediate chamber having the membrane as a part of the partition wall, when the liquid of the main liquid chamber flows into the intermediate chamber through the first orifice passage, the membrane is elastically deformed to bulge toward the main liquid chamber side. Accordingly, while the liquid of the main liquid chamber flows into the second orifice passage, a flow velocity thereof is reliably decreased.

As described above, a high damping force can be generated when a bound load for causing the liquid to flow from the main liquid chamber toward the sub liquid chamber side is input.

On the other hand, when the liquid on the sub liquid chamber side flows through the first orifice passage toward the main liquid chamber, even if the flow resistance is different between the main liquid chamber side portion and the intermediate chamber side portion, since both the portions constitute one continuous orifice passage, resistance that occurs when the liquid passes through the boundary portion can be suppressed, and a damping force that is generated when a rebound load for causing the liquid to flow from the sub liquid chamber side toward the main liquid chamber is input can be suppressed.

Accordingly, the damping force generated when the bound load is input can be made larger than the damping force generated when the rebound load is input, and when a difference between these two damping forces is increased, a ratio of the damping force generated when the bound load is input to the damping force generated when the rebound load is input can be increased.

Further, even when the main liquid chamber suddenly gains a negative pressure according to an input of a large rebound load, since the membrane bulges and is deformed toward the main liquid chamber side such that the negative pressure of the main liquid chamber can be suppressed, occurrence of cavitation can also be suppressed.

Also, since these operations and effects are achieved by the configuration in which, for example, a member that operates when the hydraulic pressure in the main liquid chamber reaches a predetermined value is not employed, the flow resistance of the liquid in the main liquid chamber side portion is higher than the flow resistance of the liquid in the intermediate chamber side portion as described above, and the membrane forms a part of the partition walls of both the main liquid chamber and the intermediate chamber, the above-described operations and effects can be stably and accurately achieved even with vibrations having relatively small amplitudes.

Also, the opening direction in which the first orifice passage opens toward the intermediate chamber may intersect the opening direction in which the second orifice passage opens toward the intermediate chamber.

In this case, the liquid that has flowed into the intermediate chamber from the main liquid chamber side can be inhibited from going straight toward the second orifice passage, and this liquid can be diffused in the intermediate chamber. Thereby, while the liquid of the main liquid chamber flows into the second orifice passage, the flow velocity thereof is more reliably decreased.

Also, a cross-sectional area of the intermediate chamber in a direction perpendicular to the opening direction in which the second orifice passage opens toward the intermediate chamber may be larger than a flow path cross-sectional area of the second orifice passage.

In this case, since the cross-sectional area of the intermediate chamber is larger than the flow path cross-sectional area of the second orifice passage, the resistance generated when the liquid of the intermediate chamber flows into the second orifice passage can be increased, and the damping force generated when the bound load is input can be reliably increased.

Also, the main liquid chamber side portion of the first orifice passage may be formed as a passage of which a flow path length is larger than a flow path diameter.

In this case, since the main liquid chamber side portion of the first orifice passage is formed as a passage of which the flow path length is larger than the flow path diameter, the resistance applied to the liquid flowing through this portion from the main liquid chamber side can be more reliably increased.

In addition, the components in the above-described embodiments can be appropriately replaced with well-known components without departing from the spirit and scope of the present invention, and furthermore, the above-described modified examples may be appropriately combined.

INDUSTRIAL APPLICABILITY

According to the present invention, a damping force generated when a rebound load is input can be made larger than a damping force generated when a bound load is input. Also, according to the present invention, the damping force generated when the bound load is input can be made larger than the damping force generated when the rebound load is input.

What is claimed is:

1. A vibration isolation device comprising:
a cylindrical first mounting member connected to one of a vibration generating unit and a vibration receiving unit and a second mounting member connected to the other thereof;
an elastic body connecting the first mounting member and the second mounting member; and
a partition member which partitions a liquid chamber in the first mounting member into a main liquid chamber including the elastic body as a part of a partition wall thereof and a sub liquid chamber, wherein
the partition member includes:
a membrane which forms a part of the partition wall of the main liquid chamber; and
a first orifice passage which communicates with the main liquid chamber and opens toward the sub liquid chamber,
a flow resistance of a liquid in a portion positioned on the main liquid chamber side and a flow resistance of a liquid in a portion positioned on the sub liquid chamber side are different from each other in the first orifice passage,
the first orifice passage is constituted by a first orifice groove positioned on the main liquid chamber side and extending in a circumferential direction, a second orifice groove positioned on the sub liquid chamber side and extending in the circumferential direction, and a connection hole, and
the connection hole connects in a radial direction an end portion on one side in the circumferential direction of the first orifice groove and an end portion on one side in the circumferential direction of the second orifice groove, the end portion on the one side in the circumferential direction of the first orifice groove and the end portion on the one side in the circumferential direction of the second groove being disposed at equivalent circumferential positions.

2. The vibration isolation device according to claim 1, wherein the flow resistance of the liquid in the portion positioned on the main liquid chamber side is higher than the flow resistance of the liquid in the portion positioned on the sub liquid chamber side in the first orifice passage.

3. The vibration isolation device according to claim 2, wherein the partition wall includes:
an intermediate chamber positioned on a side opposite to the main liquid chamber with the membrane sandwiched therebetween and having the membrane as a part of a partition wall thereof; and
a second orifice passage which is configured to allow the intermediate chamber and the sub liquid chamber to communicate with each other.

4. The vibration isolation device according to claim 3, wherein an opening portion of the second orifice passage on the intermediate chamber side faces the membrane.

5. The vibration isolation device according to claim 4, wherein the first orifice passage opens toward the intermediate chamber, and an opening direction thereof intersects an opening direction in which the second orifice passage opens toward the intermediate chamber.

6. The vibration isolation device according to claim 3, wherein
the first orifice passage opens toward the intermediate chamber, and
an opening direction thereof intersects an opening direction in which the second orifice passage opens toward the intermediate chamber.

7. The vibration isolation device according to claim 1, wherein the flow resistance of the liquid in the portion positioned on the sub liquid chamber side is higher than the flow resistance of the liquid in the portion positioned on the main liquid chamber side in the first orifice passage.

8. The vibration isolation device according to claim 7, wherein the partition wall includes:
an intermediate chamber positioned on a side opposite to the main liquid chamber with the membrane sandwiched therebetween and having the membrane as a part of a partition wall thereof; and
a second orifice passage which is configured to allow the intermediate chamber and the sub liquid chamber to communicate with each other.

9. The vibration isolation device according to claim 8, wherein an opening portion of the second orifice passage on the intermediate chamber side faces the membrane.

10. The vibration isolation device according to claim 9, wherein
the first orifice passage opens toward the intermediate chamber, and
an opening direction thereof intersects an opening direction in which the second orifice passage opens toward the intermediate chamber.

11. The vibration isolation device according to claim 8, wherein the first orifice passage opens toward the intermediate chamber, and an opening direction thereof intersects an opening direction in which the second orifice passage opens toward the intermediate chamber.

12. The vibration isolation device according to claim 1, wherein the partition wall includes:
an intermediate chamber positioned on a side opposite to the main liquid chamber with the membrane sandwiched therebetween and having the membrane as a part of a partition wall thereof; and a second orifice passage which is configured to allow the intermediate chamber and the sub liquid chamber to communicate with each other.

13. The vibration isolation device according to claim 12, wherein an opening portion of the second orifice passage on the intermediate chamber side faces the membrane.

14. The vibration isolation device according to claim 13, wherein
the first orifice passage opens toward the intermediate chamber, and
an opening direction thereof intersects an opening direction in which the second orifice passage opens toward the intermediate chamber.

15. The vibration isolation device according to claim 14, wherein
the first orifice passage opens toward the intermediate chamber, and
an opening direction thereof intersects an opening direction in which the second orifice passage opens toward the intermediate chamber.

16. The vibration isolation device according to claim 13, wherein a cross-sectional area of the intermediate chamber in a direction perpendicular to the opening direction in which the second orifice passage opens toward the intermediate chamber is larger than a flow path cross-sectional area of a portion of the first orifice passage on the intermediate chamber side.

17. The vibration isolation device according to claim 12, wherein
the first orifice passage opens toward the intermediate chamber, and
an opening direction thereof intersects an opening direction in which the second orifice passage opens toward the intermediate chamber.

18. The vibration isolation device according to claim 17, wherein a cross-sectional area of the intermediate chamber in a direction perpendicular to the opening direction in which the second orifice passage opens toward the intermediate chamber is larger than a flow path cross-sectional area of a portion of the first orifice passage on the intermediate chamber side.

19. The vibration isolation device according to claim 12, wherein a cross-sectional area of the intermediate chamber in a direction perpendicular to the opening direction in which the second orifice passage opens toward the intermediate chamber is larger than a flow path cross-sectional area of a portion of the first orifice passage on the intermediate chamber side.

20. The vibration isolation device according to claim 12, wherein a portion of the first orifice passage on the intermediate chamber side is formed as a passage of which a flow path length is larger than a flow path diameter.

* * * * *